US011106662B2

(12) United States Patent
Wan et al.

(10) Patent No.: US 11,106,662 B2
(45) Date of Patent: Aug. 31, 2021

(54) SESSION-AWARE RELATED SEARCH GENERATION

(71) Applicant: Microsoft Technology Licensing, LLC, Redmond, WA (US)

(72) Inventors: Zhong Yi Wan, Cambridge, MA (US); Weiwei Guo, Foster City, CA (US); Michaeel M. Kazi, Foster City, CA (US); Huiji Gao, Sunnyvale, CA (US); Bo Long, Palo Alto, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 201 days.

(21) Appl. No.: 16/584,844

(22) Filed: Sep. 26, 2019

(65) Prior Publication Data

US 2021/0097063 A1 Apr. 1, 2021

(51) Int. Cl.

| | |
|---|---|
| ***G06F 16/242*** | (2019.01) |
| ***G06N 3/04*** | (2006.01) |
| ***G06N 3/08*** | (2006.01) |
| ***G06F 16/2457*** | (2019.01) |

(52) U.S. Cl.

CPC ...... *G06F 16/242* (2019.01); *G06F 16/24578* (2019.01); *G06N 3/0445* (2013.01); *G06N 3/08* (2013.01)

(58) Field of Classification Search

CPC ............ G06F 16/242; G06F 16/24578; G06N 3/0445; G06N 3/08

See application file for complete search history.

(56) References Cited

U.S. PATENT DOCUMENTS

2019/0370393 A1* 12/2019 Finch .................... G06F 40/274
2019/0384762 A1* 12/2019 Hill ..................... G06F 16/9535

OTHER PUBLICATIONS

Genthial, Guillaume, "Seq2Seq with Attention and Beam Search", Retrieved From: https://guillaumegenthial.github.io/sequence-to-sequence.html, Nov. 8, 2017,11 Pages.

Hochreiter, et al., "Long Short Term Memory", In Journal of Neural Computation vol. 9 Issue 8, Nov. 15, 1997, 11 Pages.

(Continued)

*Primary Examiner* — Etienne P Leroux

(74) *Attorney, Agent, or Firm* — Hickman Becker Bingham Ledesma LLP

(57) ABSTRACT

In an embodiment, the disclosed technologies include extracting, from at least one search log, session data including at least three semantically related queries and corresponding timestamp data; using the session data, creating a training sequence that includes source query data, context query data, and target query data, the source query data having both a temporal relationship and a lexical relationship to the target query data and the context query data having a temporal relationship to the source query data; creating a learned model by, using a machine learning-based modeling process, learning a mapping of a semantic representation of the context query data and the source query data to a semantic representation of the target query data; in response to a new query, using the learned model to generate at least one recommended query that is semantically related to the new query.

20 Claims, 11 Drawing Sheets

(56) References Cited

OTHER PUBLICATIONS

Sutskever, et al., "Sequence to Sequence Learning with Neural Networks", In Proceedings of Advances in Neural Information Processing Systems, Dec. 14, 2014, 9 Pages.
Wu, et al., "Google's neural machine translation system: Bridging the gap between human and machine translation", In Repository of arXiv preprint arXiv:1609.08144, Sep. 26, 2016, pp. 1-23.
Zalem, et al., "Sequence to Sequence Learning for Query Expansion", In Proceedings of the AAAI Conference on Artificial Intelligence, Jul. 17, 2019, 8 Pages.

* cited by examiner

SESSION-AWARE RELATED SEARCH GENERATION

TECHNICAL FIELD

Technical fields to which the present disclosure relates include search engines, query interpretation, and query formulation. Other technical fields to which this disclosure relates include machine learning and natural language processing.

BACKGROUND

In search engines, related search technologies aim to automatically generate queries that are related to the query that a user has most recently entered in some way. A related search may include broader, narrower or different search terms than the user's most recent search. Collaborative filtering has been used to generate related search recommendations. Examples of technologies that use collaborative filtering include the "People who bought that also bought" and "Related products" features of e-commerce web sites.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
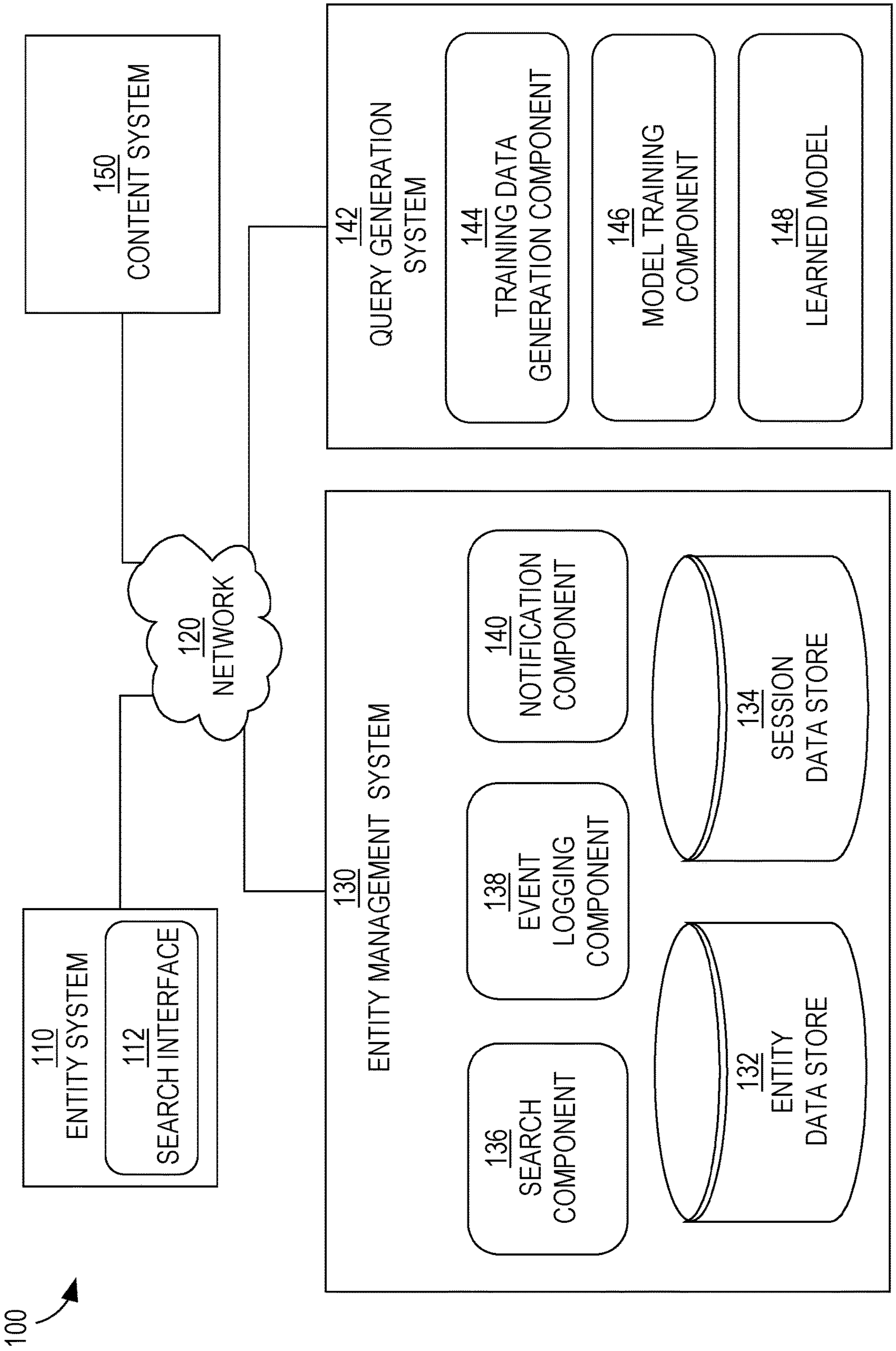
FIG. 1 is a block diagram of an example of a system that includes at least one computer capable of generating queries, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A drawback of prior approaches to query recommendation is that they rely on the existence of previous queries that are similar to a user's current search in some way. If no similar prior searches are available, a collaborative filtering algorithm, for example, will not be able to predict related search suggestions very well. This is known as the cold start problem. A benefit of embodiments of the disclosed technologies is that machine learning-based approaches are configured to address the need for a solution to the cold start problem.

Another drawback of prior approaches is that the user's current search is assumed to accurately represent the user's intent. For example, if a user's current search is for "red sox," rather than considering whether the user meant to refer to the baseball team or to colored socks, prior approaches may assume the user's intent is to search for news articles on the baseball team and produce a related search recommendation such as "red sox home schedule" or "red sox memorabilia," even though the user actually might have intended to search for red socks.

Another benefit of embodiments of the disclosed technologies is that the mapping that is learned using the disclosed machine learning-based approaches includes semantic information about at least one context query, the source query, and the target query. As a result, the disclosed technologies may produce a search recommendation that includes a rephrasing of the user's original query that more broadly or more narrowly states not just the words of original query but the user's intent with regards to the meaning of the original query.

Yet another benefit of embodiments of the disclosed technologies is that the learned mapping preserves word order, so that the word order of query recommendations corresponds to the word order of the input. Thus, if a search query is entered as "AI engineer," a recommended query produced by the system could be "deep learning engineer" as opposed to "engineer deep learning." On the other hand, if the model is trained for a domain in which search queries are typically entered using a particular or unusual word order, the query recommendations produced by the system would also reflect the particular or unusual word order.

In an embodiment, the learned model is created using a deep learning process, such as a sequence-to-sequence learning process to train at least one recurrent neural network. In the past, sequence-to-sequence modeling has been used to perform machine translation; e.g., to translate text from English to Mandarin or vice versa. However, sequence-to-sequence modeling has not been previously used to generate related search suggestions in the manner disclosed herein. Thus, embodiments of the disclosed technologies include an unconventional application of sequence-to-sequence modeling techniques.

In an embodiment, a training sequence is created from session data. The training sequence includes at least one context query, a source query, and a target query arranged in a temporal order. The training sequence is used to train a model using a machine learning-based process. Through the machine learning-based process, the model learns a mapping between the at least one context query and the source query, on the one hand, and the target query, on the other hand. The resulting learned model then can be used to generate related search suggestions that may better represent a user's intent than the query entered by the user, even for previously unseen queries. Experimental results have shown that use of the disclosed approaches can improve the quality of system-generated related search suggestions.

System Overview

FIG. 1 is a block diagram of an example system 100 for generating related queries, in an embodiment. System 100 includes an entity system 110, a network 120, an entity management system 130, a query generation system 142, and a content system 150. Entity system 110 is configured to communicate bidirectionally with at least entity management system 130 over network 120. Entity management system 130 is configured to communicate bidirectionally with at least query generation system 142 and content system 150 over network 120. Query generation system 142 is configured to communicate bidirectionally with at least entity management system 130 over network 120.

System 100 or any of its component systems 110, 130, 142, 150 may include any number of client computers and/or server computers that interact with each other over network 120. For example, system 100 or any of its component systems 110, 130, 142, 150 may comprise multiple computing elements and devices that may be connected in a local network or distributed regionally or globally across many networks via the Internet. Although depicted in FIG. 1 as individual systems, all or portions of entity system 110, entity management system 130, query generation system 142 and/or content system 150 may be part of the same overall system and may be provided or owned or managed by the same entity.

Portions of system 100 may be implemented as a web application. For example, a portion of system 100 may operate in entity management system 130 or query generation system 142 and another portion may operate in a web browser executing on a client device, such as an entity system 110. In such embodiment, the web browser transmits a HTTP request over a network (e.g., the Internet) in response to user input (e.g., entering of text and selection of a graphical button) that is received through a user interface provided by the web application and displayed through the web browser. Entity management system 130 or query generation system 142 receives the input, performs one or more operations to conduct a search of, for example, content system 150, and returns one or more results to the client device in an HTTP response that the web browser receives and processes. Alternatively, a client-side application is installed and executes on a client device and is configured to communicate with entity management system 130 and/or query generation system 142 over a network.

Entity system 110 interacts with entity management system 130; for example, by communicating queries, events, data and/or instructions to entity management system 130 and/or obtaining data and/or instructions from entity management system 130. Entity system 110 includes an event interface 112. Event interface 112 may be implemented as a user interface operable by one or more end users of entity management system 130 and/or as an application program interface (API) through which other components and/or systems may interact with entity management system 130. For example, event interface 112 may facilitate events, such as creating and executing search queries or viewing and manipulating entity data stored in entity data store 132, session data store 134, and/or content system 150.

Content system 150 includes a searchable store of digital content, which may be updated to include new items of content from time to time. Content system 150 may include online and/or offline data sources, and may include a set of entities. In other embodiments, content system 150 may include web sites on the Internet; for example, web sites that publish news articles, blogs, comments, tweets, and reviews; social media pages, posts, and/or news feeds. Digital content within content system 150 can be searched and retrieved by, for example, an Internet search engine, an RSS (Really Simple Syndication) feed or a web crawler operated by search component 136 cooperating with search interface 112.

As used herein, an example of a system is an application or a computing device or a combination of electronic devices or a combination of at least one application and at least one device. Examples of computing devices and electronic devices include server computers, laptop computers, tablet computers, smartphones, desktop computers, personal digital assistants (PDAs), wearable electronic devices, and smart appliances.

An example of an application is a native application that is installed on a particular type of computing device or configured to operate with a particular operating system. Another example of an application is a client application that is downloaded from a server computer and executes within web browser software running on a computing device. Another example of an application is a server application that runs on a server computer or on a network of server computers. An application may be implemented in hardware, software, or a combination of hardware and software. An application may include a data store or may be communicatively coupled to a data store. Thus, a system may include a combination of an application and a data store. As used herein, the term data store may refer to a logical data structure, such as a searchable database, an index, a table, a tree, or an electronic file, such as an HTML (Hypertext Markup Language) file or an XML (Extensible Markup Language) file.

Although the various systems, data stores, components and devices are depicted in the figures and described as including certain features, all embodiments are not limited to requiring these features and some embodiments may include additional features not described herein. Further, the particular arrangement of systems, components, data stores, and devices shown in the drawings represents one example of an implementation. It will be understood that items shown as separate components, devices, systems, or data stores may be combined together in other implementations and that individual items may be further broken down into smaller elements or subsets of functionality in other implementations.

Network 120 may be implemented on any medium or mechanism that provides for the exchange of data, signals, and/or instructions between component systems 110, 150, 130, 140 of system 100. Examples of network 120 include, without limitation, a Local Area Network (LAN), a Wide Area Network (WAN), an Ethernet network or the Internet, or one or more terrestrial, satellite or wireless links, or a combination of any number of different networks and/or communication links.

Entity Management System

In the embodiment of FIG. 1, entity management system 130 includes an entity data store 132, a session data store 134, a search component 136, an event logging component 138, and a notification component 140. Although not specifically shown in FIG. 1, it will be understood that entity data store 132, session data store 134, search component 136, event logging component 138, and notification component 140 are bidirectionally communicatively coupled as needed to perform the functionality of entity management system 130. Examples of components are applications, computer program modules, and code libraries. Examples of communicative coupling mechanisms include inter-process communication (IPC) interfaces and application program interfaces (APIs).

Entity data store 132 and session data store 134 each may reside on one or more persistent and/or volatile storage devices that may reside within the same local network as entity management system 130 and/or in a network that is remote relative to entity management system 130. Thus, although depicted as being included in entity management system 130, each data store 132, 134 may be part of entity management system 130 or accessed by entity management system 130 over a network, such as network 120. Entity data store 132 stores data relating to entities, including entity identifiers.

Session data store 134 stores historical data relating to search query events detected by event logging component 138, described below, as having been performed by at least one user in entity management system 130. Session data store 134 includes, for example, search logs, which are data records of search activities performed by users of entity management system 130. In an embodiment, each search activity is stored as a separate entity. In an embodiment, a search activity entity includes at least a user identifier, a timestamp, and a raw query as entered by the user.

Search component 136 includes an interface that enables users and/or automatic processes to initiate searches of entity data store 132 or session data store 134 or content system 150 and to retrieve results of those searches. Thus, search component 136 may provide a user interface to allow users of entity system 110 to search entity data store 132 or session data store 134 or content system 150 and/or provide an API to allow executing programs or processes of query generation system 142 to issue queries that search component 136 processes against data stored in entity data store 132 or session data store 134 or content system 150. For example, query generation system 142 may utilize search component 136 to search session data store 134 to identify at least one training instance, where a training instance includes a target query, a source query, and at least one context query, as described in more detail below.

Event logging component 138 logs data relating to events that occur within entity management system 130 while in operation; for example, logins, searches, and user actions relating to digital content made available to a user of entity management system 130 via notification component 140, such as views, likes, comments, and shares of digital content. Event logging component 138 stores event data relating to logged events in session data store 134. Event logging performed by event logging component 138 may be subject to user consent as required by any applicable laws, rules, regulations or policies.

Notification component 140 generates and delivers electronic content, such as search results, search recommendations, and notifications, to user accounts of users of entity management system 130. Examples of electronic notifications include synchronous or asynchronous messages, alerts, news feed items, recommendations, listings of search results, displays of entity data, and deliveries of digital content items.

Operation of notification component 140 may be triggered by output of query generation system 142. For example, query generation system 142 may generate a signal indicating that a set of related query recommendations has been generated in response to a user's most recently entered query. Notification component 140 may act on this signal by generating a list of related query recommendations that is then displayed, for example, in a list box on a search screen of a graphical user interface; for example, search interface 112.

In an embodiment, entity management system 130 is implemented as or includes an entity search and retrieval service that is supported by a connection network. Examples of connection networks include social networks, professional connection networks, and other applications that store data pertaining to entities and indicate relationships or 'connections' between and among entities. In this context, entity data store 132 stores entity data records that include profile data and connection data associated with individual entities. An entity may be a person, an organization (e.g., a company, a charity, a non-profit organization, a government agency, an alumni group, etc.), a group of people, or an association. In some embodiments, job postings are implemented as entities such that the job postings are searchable using, for example, search interface 112.

Profile data for a person may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user. Profile data of an organization, such as a company, may include a company name, an address of the company, a number of employees, a listing of principals or chief executives of the company, a description of any current job openings, and a description of products or services provided by the organization. Profile data of a job posting may include a company name, a job title, a company name, a company address, a description of the job, required skills, and information about the application process, for example.

Profile data can also include derived or computed data that, with the user's consent as may be required by applicable laws, rules, or regulations, is collected and stored, for example by event logging component 138, based on actions that the user has taken within entity management system 130. Profile data can also include connection data. Connection data for an entity may include an entity identifier of another entity and a date/timestamp indicating the date and time that a connection with the other entity was made. For example, entity management system 130 may create a connection between a person entity and a job posting entity when the user represented by the person entity in entity management system 130 submits an online application in response to a job posting.

A user of entity management system 130 may correspond to one or more entities that are stored in entity data store 132. For example, a single user may create multiple different entities within entity management system 130, each with a same or similar name or title but targeted to a different purpose, interest, or audience. Alternatively or in addition, a representative of an organization may create an entity within entity management system 130 that represents the organization and has an associated profile so that other users can learn about the organization, follow the organization, and/or subscribe to messages and notifications issued by and/or about the organization. A representative of an organization also may create an entity within entity management system 130 that represents a job posting made by the organization, which has an associated profile so that users can learn about the job posting, save the job posting, submit an online application and/or subscribe to messages and notifications issued by and/or about the job posting.

Examples of events that include actions that may be taken by a user, for example via a user account registered within entity management system 130, include creating and executing searches, posting or submitting content for consideration by other entities, viewing content posted by other entities, viewing entity profile pages, exchanging messages with other users, commenting on content posted by other users and following entities. Entity management system 130 may prompt users to perform actions via notification component 140. For example, notification component 140 may include a push notification service that causes periodic displays of content or content-related notifications such as "Jobs You May be Interested In." The notifications generated by notification component 140 may be targeted to particular users or groups of users.

Training Data Generation Component

In the embodiment of FIG. 1, query generation system 142 includes a training data generation component 144, a model training component 146, and a learned model 148. Although not specifically shown in FIG. 1, it will be understood that training data generation component 144, model training component 146, and learned model 148 are bidirectionally communicatively coupled as needed to perform the functionality of query generation system 142. As described in more detail below, training data generation component 144 when executed by one or more processors generates training sequences that are used by model training component 146 to create learned model 148, as disclosed herein.

Model training component 146 inputs training data generated by training data generation component 144 to a machine learning-based modeling process to produce learned model 148. As described in more detail below, an embodiment of model training component 146 is implemented using a sequence to sequence learning process and at least one neural network, such as neural network 220 shown in FIG. 3C or neural network 240 shown in FIG. 3D, both described below. In an embodiment, model training component 146 is implemented using an attention mechanism, such as attention mechanism 260 shown in FIG. 3E, described below. In an embodiment, model training component creates a learned model 148 that includes a heuristic mechanism, such as heuristic mechanism 270 shown in FIG. 3F, described below.

Figure 2:
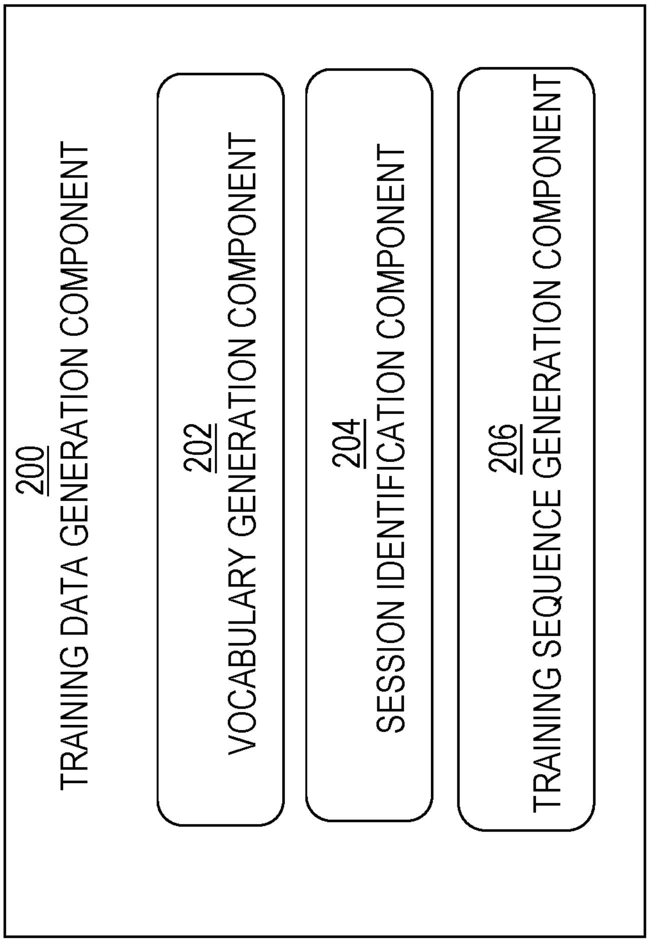
FIG. 2 is a block diagram that depicts a training data generation component, which may be part of the system of FIG. 1, in an embodiment.

An embodiment of training data generation component 144 is shown in FIG. 2. FIG. 2 is a block diagram that depicts training data generation component 200, which corresponds to training data generation component 144 of query generation system 142 of FIG. 1, in an embodiment. Training data generation component 200 includes a vocabulary generation component 202, a session identification component 204, and a training sequence generation component 206, in an embodiment. Although not specifically shown in FIG. 2, it will be understood that vocabulary generation component 202, session identification component 204, and training sequence generation component 206 are bidirectionally communicatively coupled as needed to perform the functionality of training data generation component 200.

Vocabulary generation component 202 generates, from a set of search logs, a vocabulary that is used by model training component 146, along with training sequences produced by training sequence generation component 206, to create learned model 148. The search logs are produced by event logging component 138 and stored in session data store 134, in an embodiment. The particular set of search logs pre-processed by vocabulary generation component 202 is determined by at least one criterion, such as a date range, a set of user identifiers and/or a set of geographic locations.

In an embodiment, vocabulary generation component 202 pre-processes the set of search logs to remove unusable queries, such as queries that contain inappropriate terms, and groups the remaining queries by user identifier and date. In some embodiments, vocabulary generation component 202 imposes other constraints, such as a maximum per-user daily search limit, to remove abnormal search behaviors from the search logs. The pre-processing of the search logs produces a set of search records, where a search record includes a user identifier, a date, and a query string. While described as being performed by vocabulary generation component 202, the search log pre-processing operations may be performed by another component alone or in combination with vocabulary generation component 202.

Once the search logs are pre-processed to produce the search records, in an embodiment, vocabulary generation component 202 tokenizes the search queries in the search records into words, and tabulates the words by counting the number of occurrences of each word across all of the search records. The list of words is sorted by number of occurrences in descending order so that the words with the greatest number of occurrences across all search records are retained as the vocabulary to be used to create learned model 148.

In an embodiment, a threshold value is used to determine the size of the vocabulary. For example, the threshold value is a fixed number of words, e.g., 60,000 or 100,000 words, in an embodiment. In another embodiment, the threshold value is a minimum occurrence count, such that the vocabulary includes all words that have an occurrence count that meets or exceeds the minimum occurrence count are included in the vocabulary. In any case, the threshold value for determining the vocabulary size is customizable depending on the type of search engine application. For example, the vocabulary size for a job search application may be smaller than the vocabulary size of a general purpose search engine.

Vocabulary generation component 202 outputs a vocabulary that may be stored, for example, in session data store 134. Portions of the processing performed by vocabulary generation component 202 may be performed concurrently or in parallel with the operations performed by session identification component 204 and/or training sequence generation component 206.

Session identification component 204 uses at least one criterion to identify search records to be grouped together into a single session. In an embodiment, the at least one criterion includes a temporal criterion; for example, search records having timestamps within x seconds or minutes of each other constitute a session, where x is a positive integer. In this example, search records whose timestamps are more than x seconds or minutes apart are assigned to different sessions.

Alternatively or in addition, the at least one criterion for creating sessions includes a lexical condition. For example, search records whose query strings have at least one common word are assigned to the same session. In this case, sessions are defined both by temporal and lexical criteria. As such, a session grouping may include at least two search records whose query strings evidence a common user intent or a consistent search theme.

In an embodiment, session identification component 204 further performs at least one session cleaning process after the sessions are identified. A session cleaning process removes from the session data search records that do not satisfy at least one cleaning criterion. Examples of cleaning criteria include subset criteria and difference criteria. An example of a subset criterion is, where a session includes a first query and a second query, the words of the first query are all also contained in the second query, such that the first query is a subset of the second query. In this case, the first query may be removed from the session data. For instance, if a first query of "software engineer" and a second query of "senior software engineer" both appear in a session, the first query may be removed from the session data while the second query may be retained in the session data.

An example of a difference criterion is where the difference between two queries is only stop words or other 'unimportant' words, for example words that do not appear in the vocabulary produced by vocabulary generation component 202. Examples of stop words are "of," "about," "the," and "such." For instance, if a session includes a first query of "VP of marketing" and a second query of "VP marketing," the first query may be removed from the session data and the second query may be retained in the session data.

After identifying a session and cleaning the session data as may be needed, session identification component 204 outputs session data, which identifies sets of search records with a particular session; for example, by assigning a unique session identifier to each search record in a session.

Training sequence generation component 206 processes the session data output by session identification component 204 and generates the training sequences that are used by model training component 146 to create learned model 148. In an embodiment, training sequence generation component 206 identifies, from the session data for a particular session, a training sequence that includes a target query, a source query, and at least one context query. A target query is the last query in the session data, and is the query that is to be directly predicted by the learned model. In other words, the target query represents the ground-truth label that is associated with a particular combination of a source query and at least one context query. Training sequence generation component 206 identifies the target query by looking for the most recent timestamp data in the search records of the session for which the training sequence is being generated.

In an embodiment, the source query is the query that immediately precedes the identified target query from a temporal standpoint. Training sequence generation component 206 identifies the source query by looking for the second-most recent timestamp data in the search records of the session for which the training sequence is being generated. The source query is used as the primary source of data for determining user intent with respect to the search session.

In an embodiment, a strict lexical condition is enforced between the source query and the target query; for example, the source query and the target query must have at least one word in common. In this case, the target query-source query pair may be identified during the session identification process performed by session identification component 204, and thus the target query-source query pair defines the end point of a session. Then, training sequence generation component 206 may trace backforward through the search records of the session, from a temporal standpoint, to identify at least one context query associated with the target query-source query pair. The at least one context query is used as a secondary or supplemental source for determining user intent with respect to the search session and is used to help establish the semantic relationship between the source query and the target query.

Figure 4A:
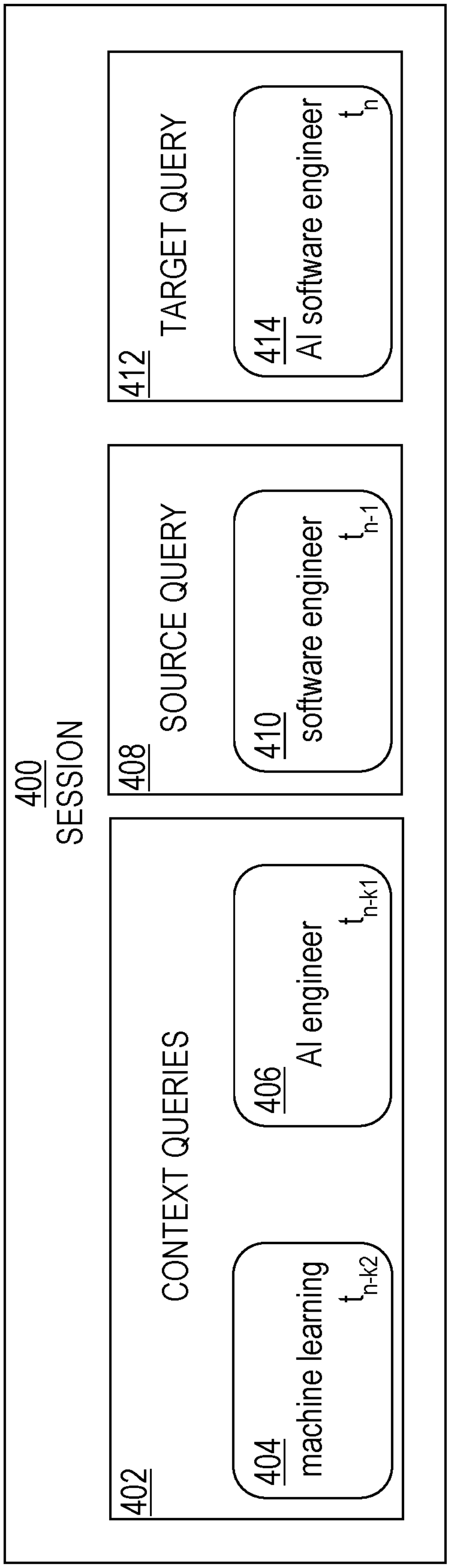
FIG. 4A is a block diagram that depicts an example of session data, which may be produced by the system of FIG. 1, in an embodiment.
Figure 4B:
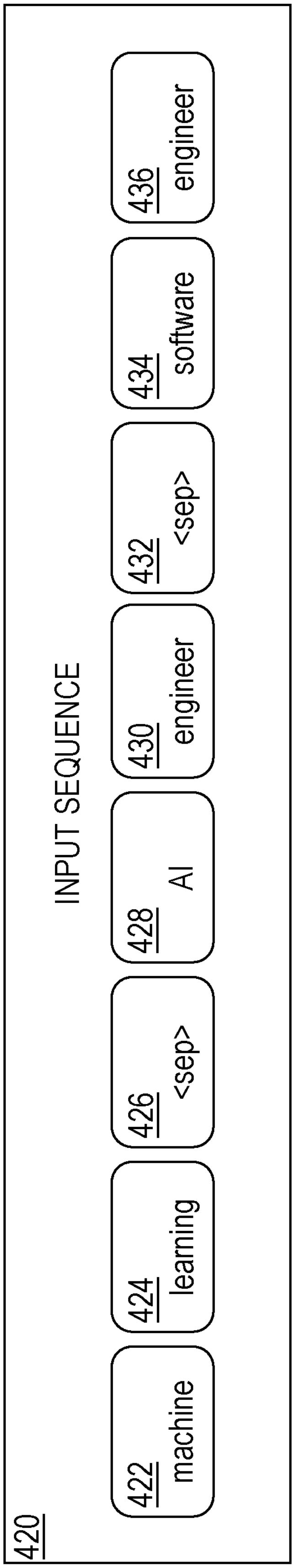
FIG. 4B is a block diagram that depicts an example of a training sequence that may be generated by the system of FIG. 1 using the session data of FIG. 4A, in an embodiment.

The number of context queries included in a session is determined by the at least one session criterion. For example, once a target query-source query pair is identified, all queries in the session data that have timestamps within x seconds or minutes of the target query, where x is a positive integer, may be included in the session. FIGS. 4A and 4B, described below, illustrate examples of a target query, a source query, and context queries.

Another example of a training sequence, with queries listed in temporal order from oldest to most recent, is as follows:

<context query> work from home

<source query> project manager

<target query> remote project manager

The above example illustrates how a source query and a target query satisfy a lexical condition (both the source query and the target query contain the words "project" and "manager) but the context query and the source query do not satisfy the lexical condition that is satisfied by the source query and the target query. That is, the context query and the source query in this example have no words in common.

The above example also illustrates how the system is able to use the context query to understand the semantics of the target query. The context query's phrase "work from home" is semantically mapped via the machine learning-based process to the word "remote," which is present in the target query. Thus, once the learned model is created, if the system, in operation, receives a new query that uses the phrase "work from home," the system may, in response to the new query, recommend a related query that uses the word "remote."

In an embodiment, training sequence generation component 206 further processes the session data to prepare the session data for use as training or testing data for creating learned model 148. In an embodiment, training sequence generation component 206 processes each training sequence by aggregating the context queries, if there is more than one context query), and then joining the aggregated context queries with the source query to produce the input portion of the training sequence that will be used as input by the model training component 146; for example, as input to an encoder, as described below.

Different approaches can be used to aggregate the context queries. In one approach, the context queries are directly concatenated, preserving the temporal word order of occurrence. The context queries in the aggregated context query string are separated from each other and from the source query by a separator token such as <s>. An example of the concatenation approach is illustrated in FIG. 4B, described below.

In another approach, words in the context queries are ranked based on the number of occurrences across all of the context queries in the session. Alternatively or in addition, the word ranking is based on temporal proximity of the word to the source query, such that words that appear closer in time to the source query are ranked higher than words that appear farther away, temporally, from the source query. In other words, more recent queries may be ranked higher than older queries. Irrespective of the word ranking approach, the more highly ranked words are considered more important than the lower ranked words, and the more important words are placed closer to the source query in the training sequence. The context queries in the aggregated context query string are separated from the source query by a separator token such as <s>. An example of the ranking approach is illustrated in FIG. 4D, described below.

Training sequence generation component 206 outputs, for each session, a training sequence that includes the aggregated context query data, source query data, and target query data for use by model training component 146.

Overview of Query Generation Process

Figure 3A:
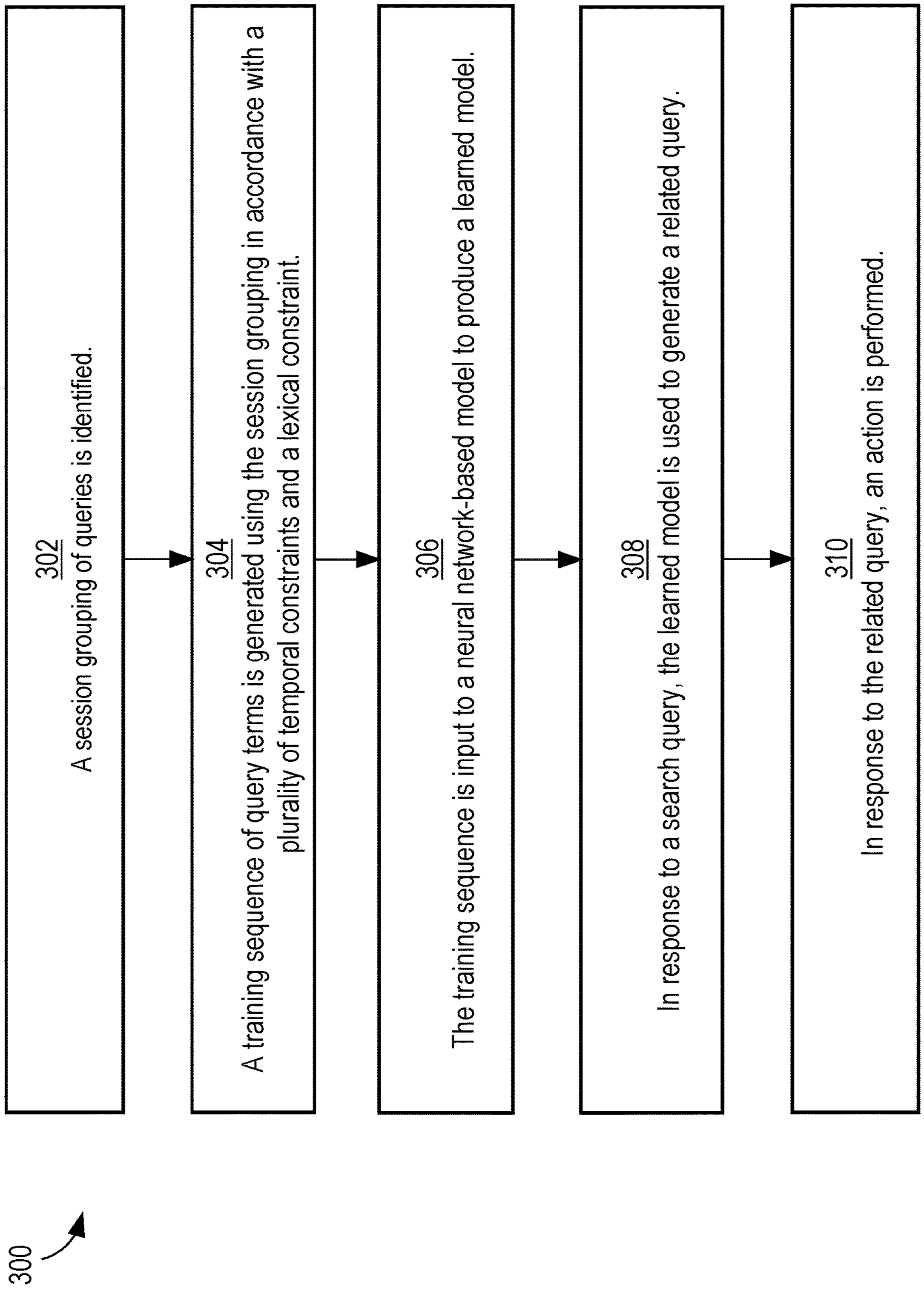
FIG. 3A is a flow diagram that depicts an example process for generating a related query, which may be performed by at least one component of the system of FIG. 1, in an embodiment.

FIG. 3A is a flow diagram that depicts an example process 300 for generating queries, in an embodiment. Process 300 may be implemented by at least one computing device; for example, one or more different components of system 100, such as one or more components of query generation system 142 alone or in combination with one or more components of entity management system 130, content system 150 and/or entity system 110.

For ease of discussion, process 300 is illustrated and described using a number of functional blocks. It will be understood, however, that this disclosure is not limited to the particular arrangement and description of the functional blocks of process 300. In addition, it will be understood that the functional blocks of process 300 can include functionality that is described elsewhere in this disclosure; for example, functionality described as being performed by system 100 or one or more of the systems or components of system 100.

At block 302, a session grouping of queries is identified. Examples of methods for identifying session groupings include those described above as being performed by training data generation component 144, 200; for example, by session identification component 204. In an embodiment, block 302 includes extracting, from at least one search log, session data that includes at least three semantically related queries and corresponding timestamp data.

At block 304, a training sequence of query terms is generated using the session grouping produced by block 302, in accordance with a plurality of temporal constraints and a lexical constraint. Examples of methods for identifying a training sequence include those described above as being performed by training data generation component 144, 200; for example, by training sequence generation component 206. In an embodiment, block 304 includes creating a training sequence that includes source query data, context query data, and target query data, where the source query data has both a temporal relationship and a lexical relationship to the target query data and the context query data has a temporal relationship and may or may not have a lexical relationship to the source query data.

At block 306, the training sequence produced by block 304 is input to a neural network-based model to produce a learned model. Operations of block 306 may be performed, for example, by model training component 146. Examples of neural network-based models which can be used to produce the learned model are shown in FIG. 3C, FIG. 3D, and FIG. 3E, described below.

In an embodiment, block 306 includes, using a machine learning-based modeling process, learning a mapping of a semantic representation of the context query data and the source query data to a semantic representation of the target query data. In an embodiment, the machine learning-based process of block 306 includes creating the learned model using a sequence to sequence modeling process and a recurrent neural network. In an embodiment, block 306 includes learning the mapping by the learned model using a customizable attention mechanism.

At block 308, in response to a search query, the learned model produced by block 306 is used to generate a related query. An example of a mechanism that can be used to generate the related query is shown in FIG. 3F, described below. In an embodiment, block 308 includes using the learned model to generate at least one recommended query that is semantically related to a new query, in response to the new query. For instance, the learned model may be created offline and then brought online in response to the new query.

In an embodiment, block 308 includes generating at least one recommended query using the learned model and a vocabulary of words extracted from the at least one search log based on frequency of occurrence of the words in the at least one search log. In an embodiment, block 308 includes generating the at least one recommended query by the learned model iteratively selecting words from the vocabulary according to a probability. In an embodiment, block 308 includes generating at least one recommended query using a beam search process or a greedy algorithmic process.

At block 310, in response to the related query, an action is performed. Examples of actions that may be performed include displaying the related query adjacent to a search input box on a graphical user interface, generating a notification, or performing any function described above as being performed by search interface 112, search component 136, or notification component 140.

Overview of Training Data Generation Process

Figure 3B:
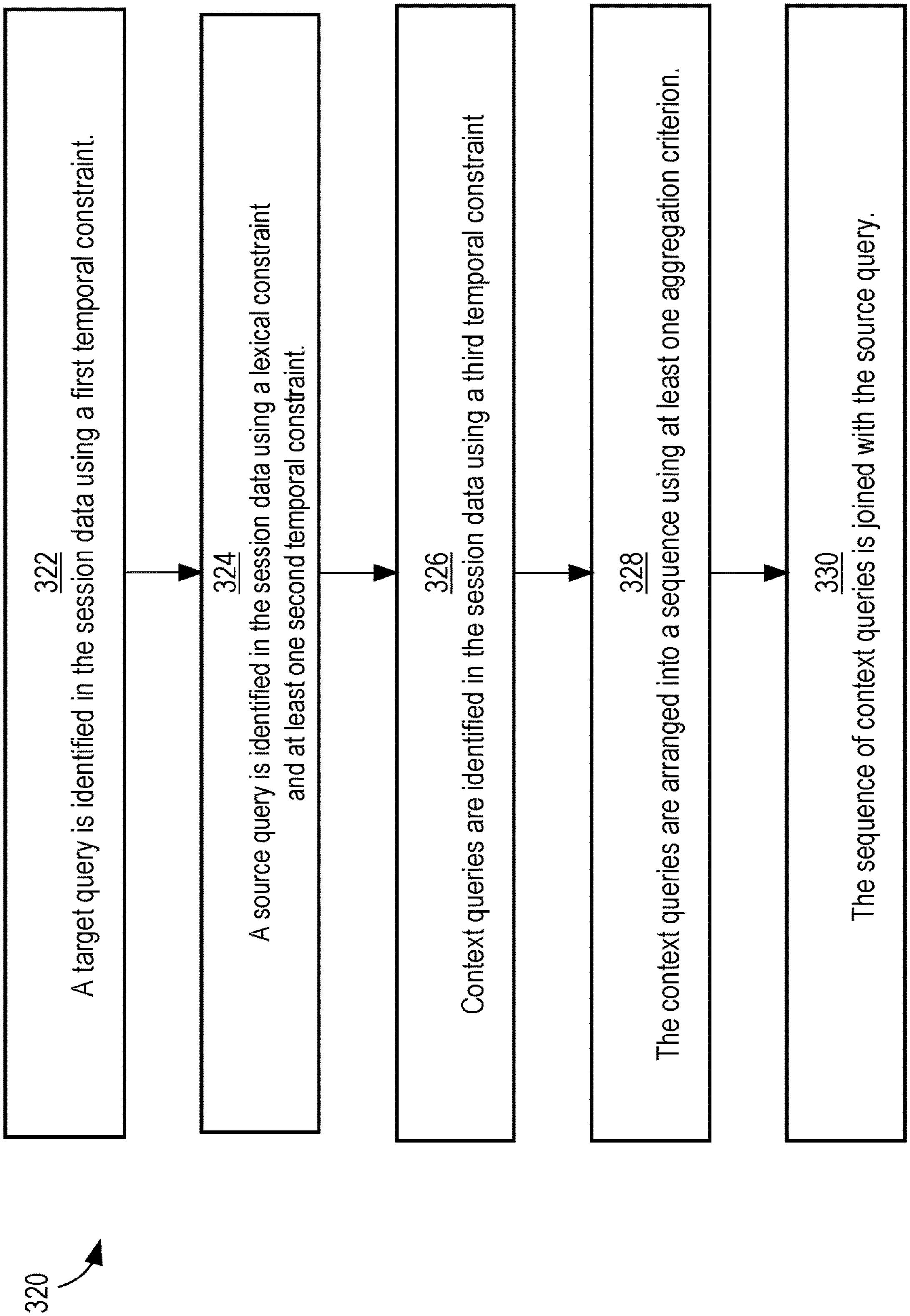
FIG. 3B is a flow diagram that depicts an example process for generating a training sequence, which may be performed by at least one component of the system of FIG. 1, in an embodiment.
Figure 3C:
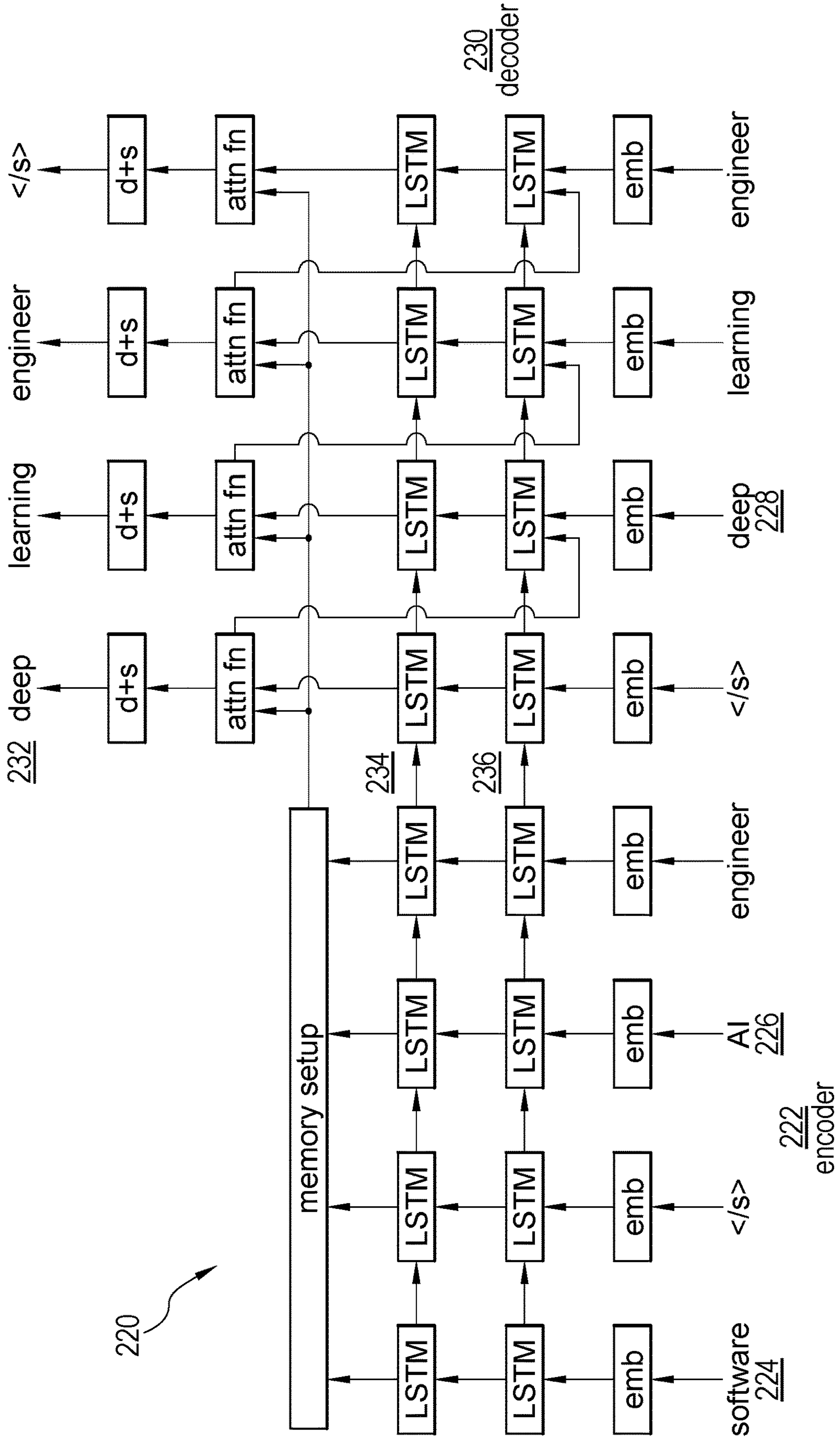
FIG. 3C is a block diagram of a learned model, which may be a component of the system of FIG. 1, in an embodiment.
Figure 3D:
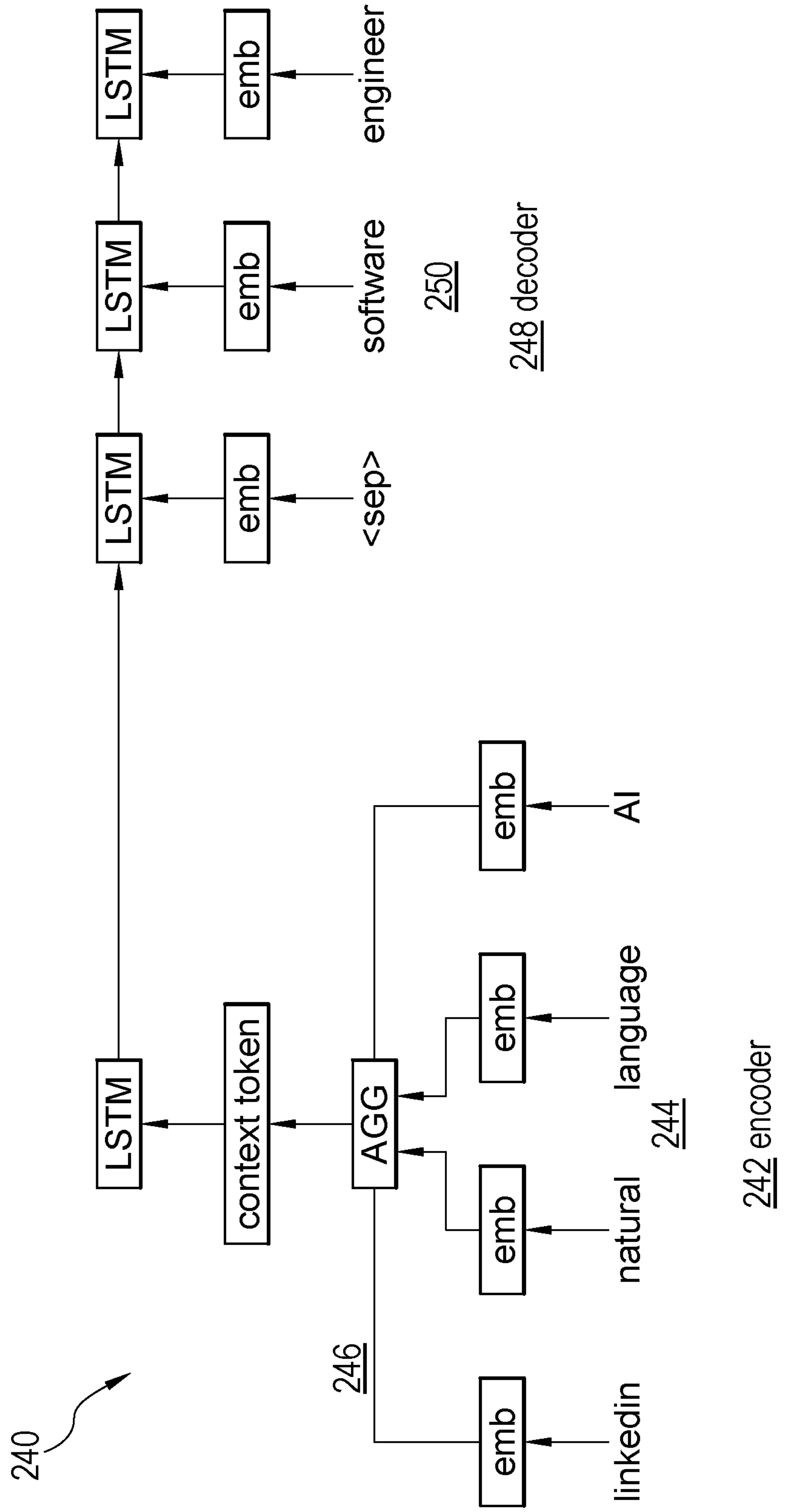
FIG. 3D is a block diagram of another learned model, which may be a component of the system of FIG. 1, in an embodiment.
Figure 3E:
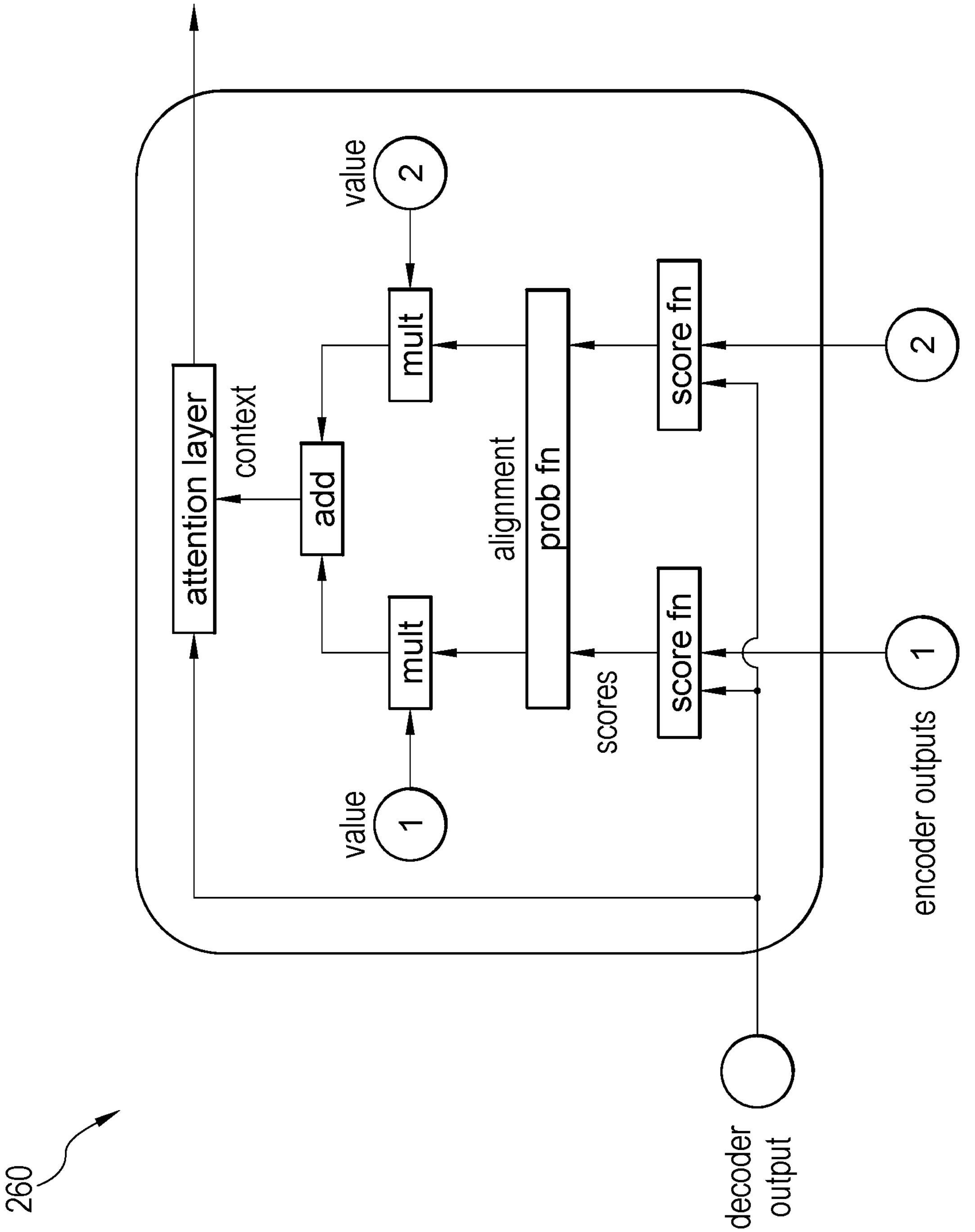
FIG. 3E is a block diagram of an attention mechanism, which may be a component of the system of FIG. 1, in an embodiment.
Figure 3F:
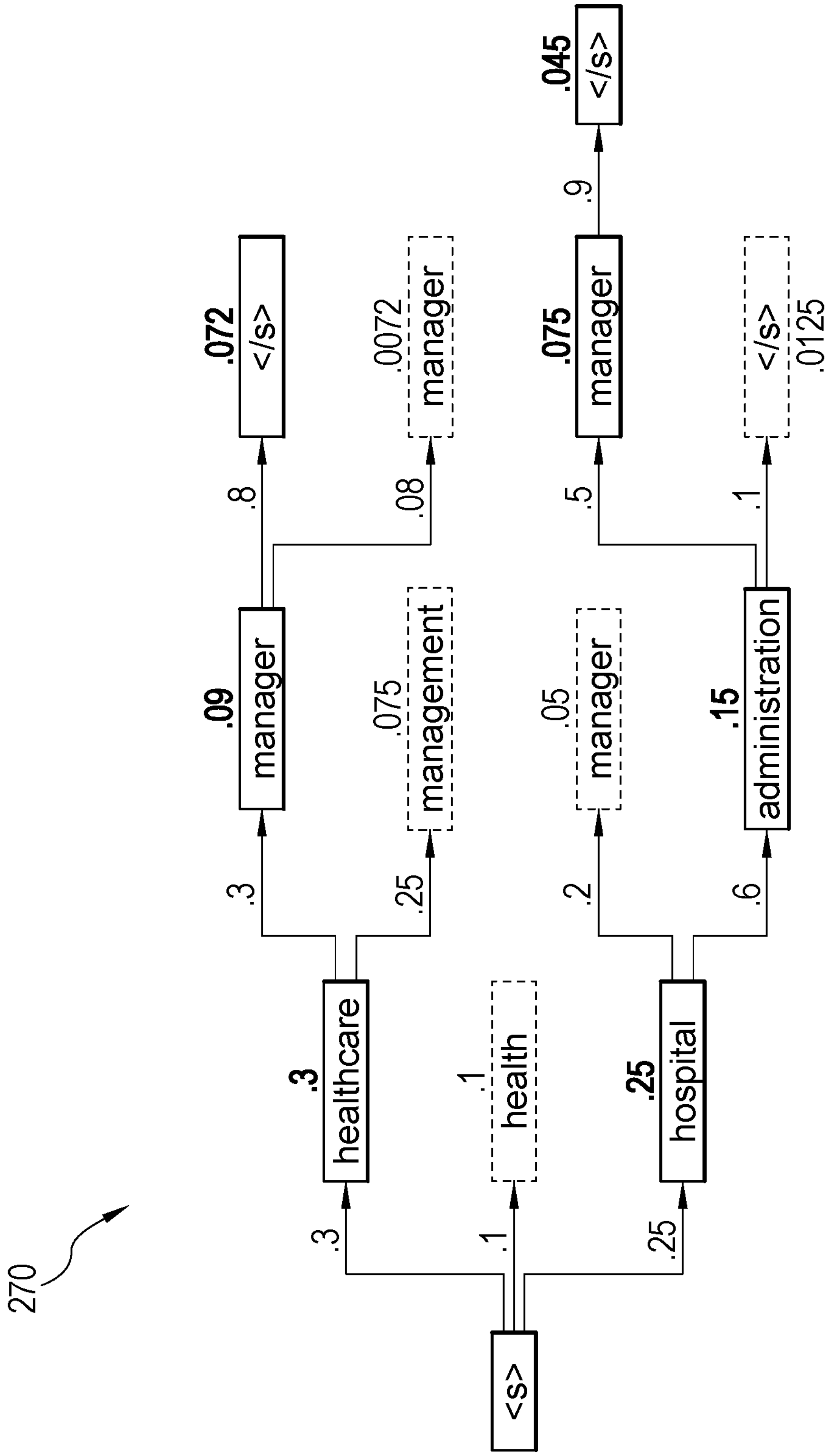
FIG. 3F is a block diagram of a heuristic mechanism, which may be a component of the system of FIG. 1, in an embodiment.

FIG. 3B is a flow diagram that depicts an example process for generating a training sequence, which may be performed by at least one component of the system of FIG. 1, in an embodiment. Process 320 may be implemented by at least one computing device; for example, one or more different components of system 100, such as one or more components of query generation system 142 alone or in combination with one or more components of entity management system 130, content system 150 and/or entity system 110.

For ease of discussion, process 320 is illustrated and described using a number of functional blocks. It will be understood, however, that this disclosure is not limited to the particular arrangement and description of the functional blocks of process 320. In addition, it will be understood that the functional blocks of process 320 can include functionality that is described elsewhere in this disclosure; for example, functionality described as being performed by system 100 or one or more of the systems or components of system 100.

At block 322, a target query is identified in the session data using a first temporal constraint. An example of an approach for identifying a target query is described above in connection with training data generation component 144, 200. In an embodiment, block 322 includes identifying the target query by determining a query of the at least three search queries that has a most recent timestamp data.

At block 324, a source query is identified in the session data using a lexical constraint and at least one second temporal constraint. Examples of approaches for identifying a source query are described above in connection with training data generation component 144, 200. In an embodiment, block 324 includes identifying the source query by determining a query of at least three queries that is lexically similar to the target query of block 322 and has first timestamp data that is older than the most recent timestamp data of block 322.

At block 326, context queries are identified in the session data using a third temporal constraint. Examples of approaches for identifying context queries are described above in connection with training data generation component 144, 200. In an embodiment, block 326 includes identifying at least one query that has second timestamp data that is older than the first timestamp data of block 324.

At block 328, the context queries are arranged into a sequence using at least one aggregation criterion. Examples of approaches for arranging context queries into a sequence are described above in connection with training data generation component 144, 200. In an embodiment, block 328 includes aggregating at least two queries that have second timestamp data older than the first timestamp data of block 324 using concatenation or by ranking query terms based on number of occurrences in the session data or proximity of occurrence to the source query. In an embodiment, block 328 includes creating the context query data by removing, from the context query data, a query that is a subset of another query of the context query data or a query that differs from another query of the context query data only by a stop word.

At block 330, the sequence of context queries is joined with the source query. Examples of approaches for joining context queries with a source query are described above in connection with training data generation component 144, 200.

Example of Learned Model

FIG. 3C is a block diagram of a learned model 220, which may be a component of the system of FIG. 1, in an embodiment. Learned model 220 is a deep neural network; more specifically, a sequence to sequence recurrent neural network (RNN). As used herein, sequence to sequence may refer to a type of model that ingests an ordered sequence of words and outputs an ordered sequence of words; that is, both the input and output of the model are sequences.

Learned model 220 includes an encoder 222, a decoder 230, an attention mechanism (represented by the "attn fn" blocks) and a heuristic mechanism (represented by the "d+s" (dense+softmax) blocks). Encoder 222 includes embedding layer (represented by the "emb" blocks) and a set of LSTM (long short term memory) layers (represented by the "LSTM" blocks). The LSTM blocks use feedback connections to store values at least temporarily.

Encoder 222 ingests an input sequence and produces a vector that is a semantic representation of the input sequence, where each dimension of the vector represents a semantic feature of the input text. During model training, the input sequence is a training sequence that includes at least one context query, a source query, and a target query, which have been extracted from historical search logs designated as training data, as described above. During live operation, the input sequence includes a source query received for example via a graphical user interface, and at least one context query extracted from a search log not designated as training data, but does not include a target query because learned model 220 predicts the target query as a related search recommendation in response to the source query. Thus, FIG. 3C illustrates learned model 220 ingesting a training sequence.

The training sequence ingested by learned model 220 in FIG. 3C includes a target query 228 ("deep learning engineer"), a source query 226 ("AI engineer"), a context query 224 ("software"), and separator tokens ("<s>") separating the target query from the source query and the source query from the context query. In the example of FIG. 3C, the concatenation approach is used to create the training sequence; that is, context query 224 is concatenated with source query 226 while maintaining temporal word order. Encoder 222 embeds each word of the training sequence 224, 226, 228 into a semantic space. To do this, encoder 222 may use, for example, a random function or a semantic model such as word2vec.

The attention mechanism ("attn fn") operatively couples decoder 230 to encoder 222. For example, semantic representations output by encoder 222 may pass through the attention mechanism before being processed by decoder 230. An example of an attention mechanism is shown in FIG. 3E, described below.

Decoder 230 produces an output sequence; for example, output sequence 232 ("deep learning engineer"). In the example of FIG. 3C, output sequence 232 matches target query 228 because FIG. 3C shows an example of model training; i.e., the model has ingested a training sequence including the target query. In live operation, output sequence 232 may or may not match a target query used to train learned model 220. Also, in live operation, decoder 230 may generate multiple candidate output sequences, each of which may be displayed as a query recommendation.

Decoder 230 uses the heuristic mechanism ("d+s") to generate a probability distribution over a set of candidate output sequences. To do this, decoder 230 uses, for example, a greedy algorithmic process and/or a beam search process, which searches the generated set of candidate output sequences and identifies words at each level of the sequence based on a probability. An example of an operation of the heuristic mechanism of decoder 230 is shown in FIG. 3F, described below.

While some aspects disclosed here may be referred to as rule-based or machine learning-based, it should be understood that references to 'model' as used herein may refer to a rule-based decision engine, a machine learning-based system, or a combination of a rule-based decision engine and a machine learning-based system. That is, where an aspect mentions a rule-based approach, it should be understood that a machine learning-based approach may be used in alternative embodiments, and vice versa. In general, a model as used herein may refer to a combination of computer programming code in which one or more decision-making algorithms are expressed; i.e., a machine learning algorithm or a set of rules, and one or more computer-implemented data structures that store data and/or parameters used by the model.

Example of Context Aggregation

FIG. 3D is a block diagram of a learned model 240, which may be a component of the system of FIG. 1, in an embodiment. Learned model 240 includes an encoder 242, which processes context queries 244 and source query 250. Each of context queries 244 and source query 250 is embedded into semantic space by an embedding function (“emb”).

Encoder 242 is similar in function to encoder 222 of FIG. 3C. However, in comparison to FIG. 3C, FIG. 3D illustrates an example of context aggregation. That is, multiple context queries 244 are embedded into semantic space and aggregated by an aggregation function 246. Aggregation function 246 combines context vectors produced by the embedding layer (“emb”) into a single context token before the semantic representation of the aggregated context queries is joined with the semantic representation of source query 250.

Example of Attention Mechanism

FIG. 3E is a block diagram of an attention mechanism 260, which may be a component of the system of FIG. 1, in an embodiment. Attention mechanism 260 trains the learned model to focus on particular elements using customizable weights. For example, in an embodiment, attention mechanism 260 is configured to give more importance (higher weights) to queries that have more recent timestamps and less importance (lower weights) to older queries.

As shown in FIG. 3E, attention mechanism 260 receives as inputs encoder output values 1, 2, and produces decoder output (query recommendations). Attention mechanism 260 includes scoring functions, a probability function, weighting layers (add, mult) for computing keys and values, and an attention layer. Each of these aspects of attention mechanism 260 is customizable. For example, scoring functions used can include Bandanau or Luong; probability function can be softmax or hardmax, and attention layer may default to context or use other criteria, such as word occurrence.

Example of Heuristic Mechanism

FIG. 3F is a block diagram of a heuristic mechanism 270, which may be a component of the system of FIG. 1, in an embodiment. Heuristic mechanism 270 searches portions of a graph of the vocabulary produced by vocabulary generation component 202 that contain portions of candidate output sequences produced by the decoder portion of the neural network and identifies at least one query recommendation as a result of its graph search. In the example of FIG. 3F, a greedy algorithm with beam search is used, where the beam width is 2 and the heuristic mechanism 270 generates two query recommendations by choosing, at each level of the graph, the word with the highest probability. Separator tokens (“<s>”) are used to indicate the start and end tokens of the candidate output sequences.

Referring to the graph of FIG. 3F, the first level includes candidate query terms of healthcare, health, and hospital, and corresponding probabilities 0.3, 0.1, 0.25. Since the beam width is 2, heuristic mechanism 270 selects the words with the two highest probabilities: healthcare and hospital. For each of these selected words, the graph is expanded to the next level. For healthcare, the next candidate query terms are manager and management, with probabilities of 0.09 and 0.075, respectively. For hospital, the next candidate query terms are manager and administration, with probabilities of 0.05 and 0.15, respectively. Heuristic mechanism 270 again selects the word with the highest probability for each sequence, i.e. manager following healthcare and administration following hospital.

Heuristic mechanism 270 expands the graph again, for each of these selected words, and again selects the word with the highest probability for each sequence at the new level. Heuristic mechanism 270 continues repeating this selection and graph expansion process until a separator token is reached that has a higher probability than an alternative word choice. In the illustrated example, heuristic mechanism 270 produces two query recommendations: healthcare manager and hospital administration manager. Word order can influence the outcome at each stage. For instance, in the illustrated example, the system was able to discern that it makes more sense, in terms of user intent for the search query, for the word manager to follow the word healthcare rather than the word management to follow the word healthcare.

Examples of Training Data

FIG. 4A is a block diagram that depicts an example of session data, which may be produced by the system of FIG. 1, in an embodiment. In FIG. 4A, a session 400 includes context queries 402, a source query 408 and a target query 412. Target query 412 is the most recently timestamped query at time $t_n$, where n is a positive integer and t is time measured in some increment, such as minutes or seconds. Target query 412 includes query terms 414, i.e., “AI software engineer.” Source query 408 is temporally adjacent but prior to target query 412. Source query 408 has a timestamp of tn-i and includes query terms 410, i.e., “software engineer.” Target query 412 and source query 408 satisfy a lexical constraint because both queries contain the words “software” and “engineer.” Thus, target query 412 and source query 408 satisfy a lexical constraint and a temporal constraint.

Context queries 402 include query 406, which has a timestamp of n−k1, where k1 is a positive integer, and query 404, which has a timestamp of n−k2, where k2 is a positive integer greater than k1. Thus, both queries 404, 406 satisfy a temporal constraint of having an earlier/older timestamp than source query 408 and target query 412. Context query 406 also has lexical similarity to source query 408 and target query 412, although this is not required. Context query 404 does not have lexical similarity to any of the other queries 406, 410, 414 because context query 404 does not have any words in common with any of the other queries 406, 410, 414.

FIG. 4B is a block diagram that depicts an example of a portion of an input training sequence that may be generated by the system of FIG. 1 using the session data of FIG. 4A, in an embodiment. Input sequence 420 includes a source query containing query terms 434, 436, a separator token 432, a context query containing query terms 428, 430, a separator token 426, and another context query containing query terms 422, 424. Input sequence 420 thus represents a direct concatenation of the context queries and source query of FIG. 4A. While not specifically shown in FIG. 4B, the input training sequence would also include the target query, which in this case would be “AI software engineer.”

Figure 4C:
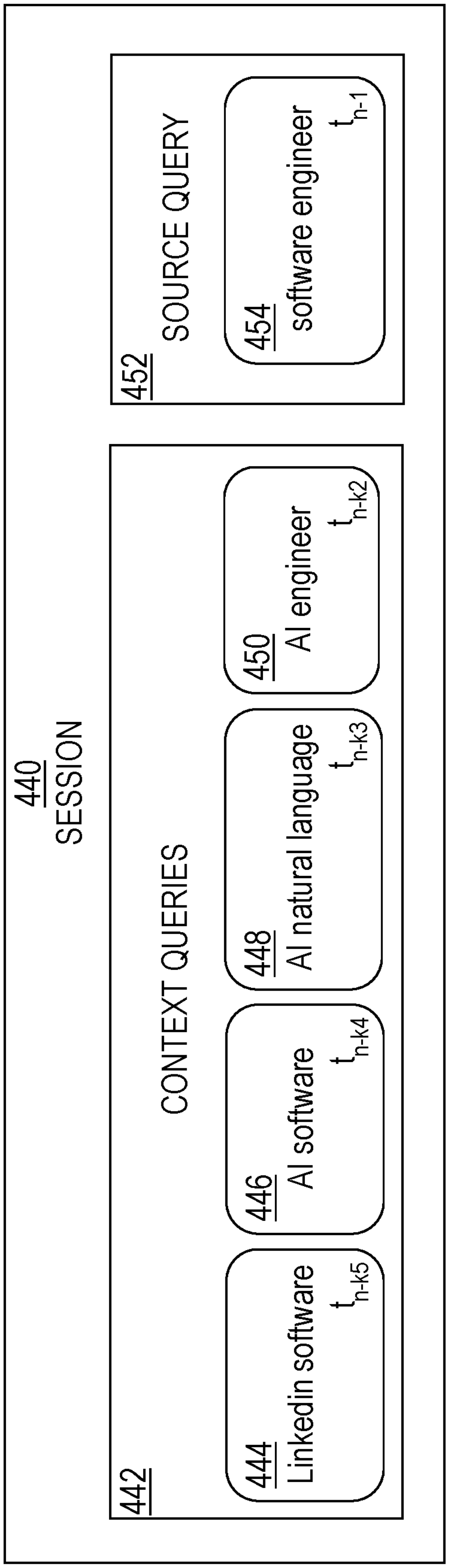
FIG. 4C is a block diagram that depicts another example of session data, which may be produced by the system of FIG. 1, in an embodiment.
Figure 4D:
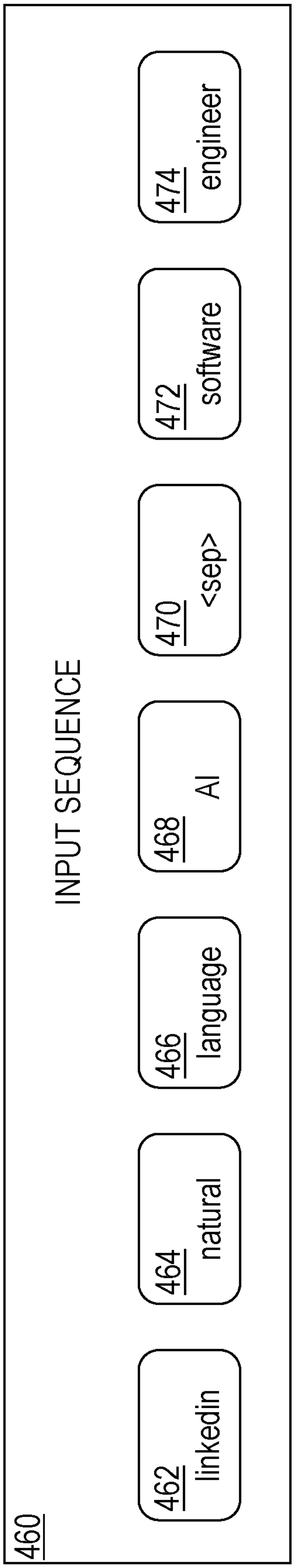
FIG. 4D is a block diagram that depicts another example of a training sequence that may be generated by the system of FIG. 1 using the session data of FIG. 4C, in an embodiment.

FIG. 4C is a block diagram that depicts another example of a portion of session data, which may be produced by the system of FIG. 1, in an embodiment. In FIG. 4C, session data 440 includes context queries 442 and source query 452. Source query 452 includes query terms 454, i.e., “software engineer” and timestamp $t_{n-1}$. Context queries 442 include queries 444, 446, 448, 450, each of which has an earlier/older timestamp than source query 452. FIG. 4D is a block diagram that depicts an example of a portion of a training sequence that may be generated by the system of FIG. 1 using the session data of FIG. 4C, in an embodiment. While not specifically shown in FIG. 4C, the session data and the training sequence would also include a target query, which in this case could be "AI software engineer" or "deep learning engineer."

In FIG. 4D, input sequence 460 includes context query terms 462, 464, 466, 468, separator token 470, and source query terms 472, 474. Context query terms 462, 464, 466, 468 are ranked and sorted based on the number of occurrences of the terms in the search records and the order of appearance of the terms in the search records, with terms occurring more recently appearing closer to the source query in the sequence. For example, the terms software and engineer are omitted from input sequence 460 because they occur in the source query, and the term AI appears adjacent to the source query because it appears multiple times in the context queries. Input sequence 460 thus represents an aggregation of the context queries of FIG. 4C joined with the source query of FIG. 4C. While not specifically shown in FIG. 4D, the input training would also include the target query, which in this case could be "AI software engineer" or "deep learning engineer."

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
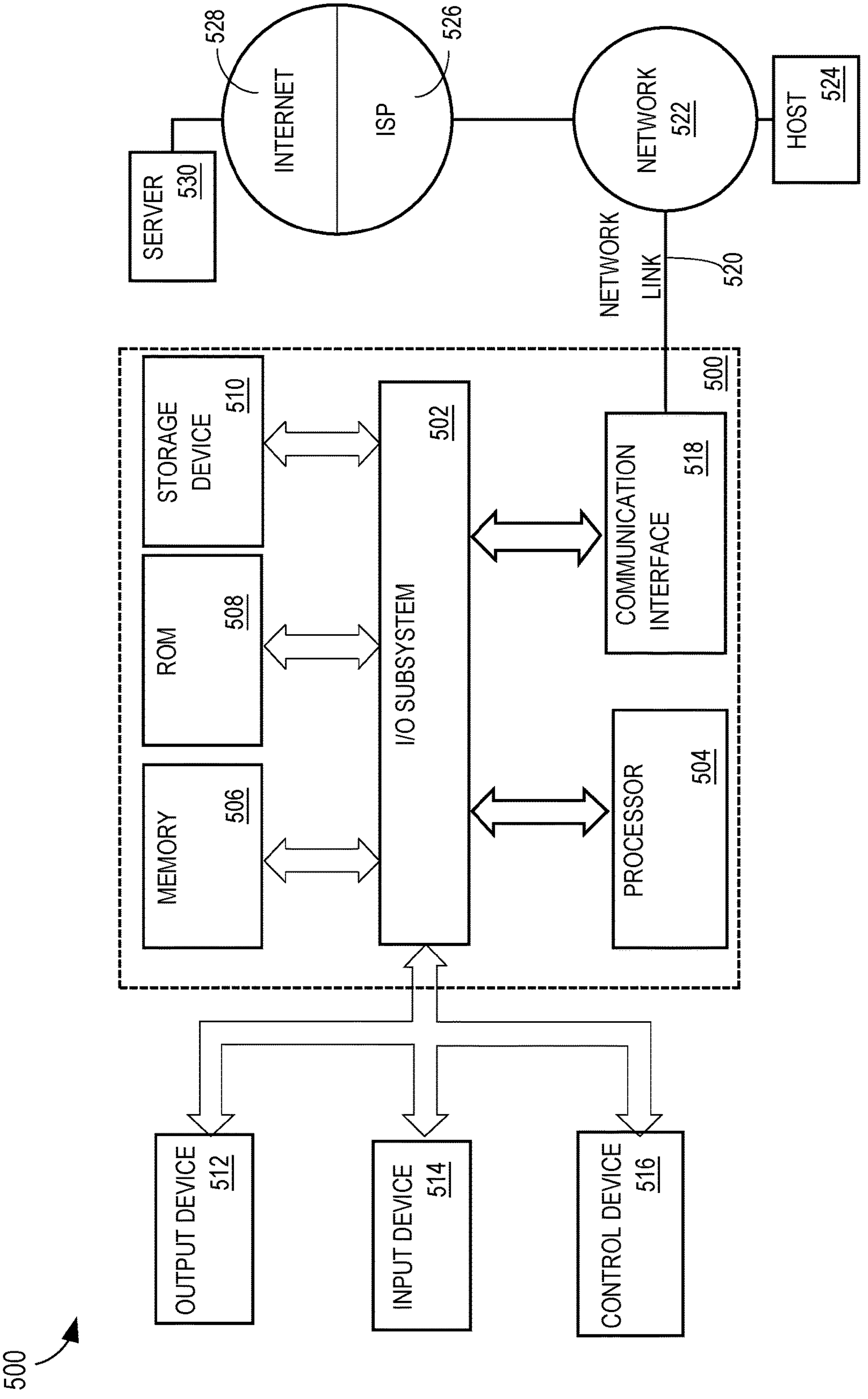
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples or a combination of the described below.

In an example 1, a method includes extracting, from at least one search log, session data including at least three semantically related queries and corresponding timestamp data; using the session data, creating a training sequence that includes source query data, context query data, and target query data, the source query data having both a temporal relationship and a lexical relationship to the target query data and the context query data having a temporal relationship to the source query data; creating a learned model by, using a machine learning-based modeling process, learning a mapping of a semantic representation of the context query data and the source query data to a semantic representation of the target query data; in response to a new query, using the learned model to generate at least one recommended query that is semantically related to the new query; where the method is performed by at least one computing device.

An example 2 includes the subject matter of example 1, further including identifying the target query data by determining a query of the at least three semantically related queries that has a most recent timestamp data. An example 3 includes the subject matter of example 2, further including identifying the source query data by determining a query of the at least three semantically related queries that is lexically similar to the target query data and has first timestamp data that is older than the most recent timestamp data. An example 4 includes the subject matter of example 3, further including creating the context query data by identifying at least one query that has second timestamp data that is older than the first timestamp data. An example 5 includes the subject matter of example 3, further including creating the context query data by aggregating at least two queries that have second timestamp data older than the first timestamp data using concatenation or by ranking query terms based on number of occurrences in the session data or proximity of occurrence to the source query data. An example 6 includes the subject matter of any of examples 1-5, further including creating the context query data by removing, from the context query data, a query that is a subset of another query of the context query data or a query that differs from another query of the context query data only by a stop word. An example 7 includes the subject matter of any of examples 1-6, further including generating the at least one recommended query using the learned model and a vocabulary that includes words extracted from the at least one search log based on a number of occurrences of words in the at least one search log. An example 8 includes the subject matter of example 7, further including generating the at least one recommended query by the learned model iteratively selecting words from the vocabulary based on probabilities associated with words in the vocabulary. An example 9 includes the subject matter of any of examples 1-8, further including creating the learned model using a sequence to sequence modeling process and a recurrent neural network, and generating the at least one recommended query using a beam search process or a greedy algorithmic process. An example 10 includes the subject matter of any of examples 1-9, further including learning the mapping by the learned model using a customizable attention mechanism.

In an example 11, at least one storage media storing instructions that, when executed by at least one processor, cause extracting, from at least one search log, session data including at least three semantically related queries and corresponding timestamp data; using the session data, creating a training sequence that includes source query data, context query data, and target query data, the source query data having both a temporal relationship and a lexical relationship to the target query data and the context query data having a temporal relationship to the source query data; creating a learned model by, using a machine learning-based modeling process, learning a mapping of a semantic representation of the context query data and the source query data to a semantic representation of the target query data; in response to a new query, using the learned model to generate at least one recommended query that is semantically related to the new query.

An example 12 includes the at least one storage media of example 11, where the instructions, when executed by the at least one processor, further cause identifying the target query data by determining a query of the at least three semantically related queries that has a most recent timestamp data. An example 13 includes the at least one storage media of example 12, where the instructions, when executed by the at least one processor, further cause identifying the source query data by determining a query of the at least three semantically related queries that is lexically similar to the target query data and has first timestamp data that is older than the most recent timestamp data. An example 14 includes the at least one storage media of example 13, where the instructions, when executed by the at least one processor, further cause creating the context query data by identifying at least one query that has second timestamp data that is older than the first timestamp data. An example 15 includes the at least one storage media of example 13, where the instructions, when executed by the at least one processor, further cause creating the context query data by aggregating at least two queries that have second timestamp data older than the first timestamp data using concatenation or by ranking query terms based on number of occurrences in the session data or proximity of occurrence to the source query data. An example 16 includes the at least one storage media of any of examples 11-15, where the instructions, when executed by the at least one processor, further cause creating the context query data by removing, from the context query data, a query that is a subset of another query of the context query data or a query that differs from another query of the context query data only by a stop word. An example 17 includes the at least one storage media of any of examples 11-16, where the instructions, when executed by the at least one processor, further cause generating the at least one recommended query using the learned model and a vocabulary that includes words extracted from the at least one search log based on a number of occurrences of words in the at least one search log. An example 18 includes the at least one storage media of example 17, where the instructions, when executed by the at least one processor, further cause generating the at least one recommended query by the learned model iteratively selecting words from the vocabulary based on probabilities associated with words in the vocabulary. An example 19 includes the at least one storage media of any of examples 11-18, where the instructions, when executed by the at least one processor, further cause creating the learned model using a sequence to sequence modeling process and a recurrent neural network, and generating the at least one recommended query using a beam search process or a greedy algorithmic process. An example 20 includes the at least one storage media of any of examples 11-19, where the instructions, when executed by the at least one processor, further cause learning the mapping by the learned model using a customizable attention mechanism.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:

extracting, from at least one search log, session data comprising at least three semantically related queries and corresponding timestamp data;

using the session data, creating a training sequence that comprises source query data, context query data, and target query data, the source query data having both a temporal relationship and a lexical relationship to the target query data and the context query data having a temporal relationship to the source query data;

creating a learned model by, using a machine learning-based modeling process, learning a mapping of a semantic representation of the context query data and the source query data to a semantic representation of the target query data;

in response to a new query, using the learned model to generate at least one recommended query that is semantically related to the new query;

wherein the method is performed by at least one computing device.

2. The method of claim 1, further comprising identifying the target query data by determining a query of the at least three semantically related queries that has a most recent timestamp data.

3. The method of claim 2, further comprising identifying the source query data by determining a query of the at least three semantically related queries that is lexically similar to the target query data and has first timestamp data that is older than the most recent timestamp data.

4. The method of claim 3, further comprising creating the context query data by identifying at least one query that has second timestamp data that is older than the first timestamp data.

5. The method of claim 3, further comprising creating the context query data by aggregating at least two queries that have second timestamp data older than the first timestamp data using concatenation or by ranking query terms based on number of occurrences in the session data or proximity of occurrence to the source query data.

6. The method of claim 1, further comprising creating the context query data by removing, from the context query data, a query that is a subset of another query of the context query data or a query that differs from another query of the context query data only by a stop word.

7. The method of claim 1, further comprising generating the at least one recommended query using the learned model and a vocabulary that includes words extracted from the at least one search log based on a number of occurrences of words in the at least one search log.

8. The method of claim 7, further comprising generating the at least one recommended query by the learned model iteratively selecting words from the vocabulary based on probabilities associated with words in the vocabulary.

9. The method of claim 1, further comprising creating the learned model using a sequence to sequence modeling process and a recurrent neural network, and generating the at least one recommended query using a beam search process or a greedy algorithmic process.

10. The method of claim 1, further comprising learning the mapping by the learned model using a customizable attention mechanism.

11. At least one storage media storing instructions that, when executed by at least one processor, cause:

extracting, from at least one search log, session data comprising at least three semantically related queries and corresponding timestamp data;

using the session data, creating a training sequence that comprises source query data, context query data, and target query data, the source query data having both a temporal relationship and a lexical relationship to the target query data and the context query data having a temporal relationship to the source query data;

creating a learned model by, using a machine learning-based modeling process, learning a mapping of a semantic representation of the context query data and the source query data to a semantic representation of the target query data;

in response to a new query, using the learned model to generate at least one recommended query that is semantically related to the new query.

12. The at least one storage media of claim 11, wherein the instructions, when executed by the at least one processor, further cause identifying the target query data by determining a query of the at least three semantically related queries that has a most recent timestamp data.

13. The at least one storage media of claim 12, wherein the instructions, when executed by the at least one processor, further cause identifying the source query data by determining a query of the at least three semantically related queries that is lexically similar to the target query data and has first timestamp data that is older than the most recent timestamp data.

14. The at least one storage media of claim 13, wherein the instructions, when executed by the at least one processor, further cause creating the context query data by identifying at least one query that has second timestamp data that is older than the first timestamp data.

15. The at least one storage media of claim 13, wherein the instructions, when executed by the at least one processor, further cause creating the context query data by aggregating at least two queries that have second timestamp data older than the first timestamp data using concatenation or by ranking query terms based on number of occurrences in the session data or proximity of occurrence to the source query data.

16. The at least one storage media of claim 11, wherein the instructions, when executed by the at least one processor, further cause creating the context query data by removing, from the context query data, a query that is a subset of another query of the context query data or a query that differs from another query of the context query data only by a stop word.

17. The at least one storage media of claim 11, wherein the instructions, when executed by the at least one processor, further cause generating the at least one recommended query using the learned model and a vocabulary that includes words extracted from the at least one search log based on a number of occurrences of words in the at least one search log.

18. The at least one storage media of claim 17, wherein the instructions, when executed by the at least one processor, further cause generating the at least one recommended query by the learned model iteratively selecting words from the vocabulary based on probabilities associated with words in the vocabulary.

19. The at least one storage media of claim 11, wherein the instructions, when executed by the at least one processor, further cause creating the learned model using a sequence to sequence modeling process and a recurrent neural network, and generating the at least one recommended query using a beam search process or a greedy algorithmic process.

20. The at least one storage media of claim 11, wherein the instructions, when executed by the at least one processor, further cause learning the mapping by the learned model using a customizable attention mechanism.

* * * * *